United States Patent [19]

Sashiki et al.

[11] Patent Number: 4,548,286
[45] Date of Patent: * Oct. 22, 1985

[54] COMBINATORIAL WEIGHING METHOD AND APPARATUS WITH VOLUME AND DENSITY SENSING

[75] Inventors: Takashi Sashiki, Nagaokakyo, Keiko Sakaeda, Kyoto, both of Japan

[73] Assignee: Kabushiki Kaisha Ishida Koki Seisakusho, Kyoto, Japan

[*] Notice: The portion of the term of this patent subsequent to Jun. 4, 2002 has been disclaimed.

[21] Appl. No.: 557,337

[22] Filed: Dec. 2, 1983

[30] Foreign Application Priority Data

Dec. 3, 1982 [JP] Japan ................................ 57-212954
Dec. 4, 1982 [JP] Japan ................................ 57-212871

[51] Int. Cl.⁴ ............................................ G01G 19/32
[52] U.S. Cl. ........................................ 177/1; 177/50; 53/121; 53/502; 53/503; 73/433
[58] Field of Search .................... 177/DIG. 12, 1, 25, 177/50, 63, 103, 123; 73/149, 433; 250/577; 222/55-57, 64, 77; 53/502, 503, 113, 121, 451

[56] References Cited

U.S. PATENT DOCUMENTS 3,703,795  11/1972  Inoue et al. ...................... 53/121
4,520,883   6/1985  Fukuda ............................. 177/1

Primary Examiner—E. A. Goldberg
Assistant Examiner—Fred L. Kampe
Attorney, Agent, or Firm—Staas & Halsey

[57] ABSTRACT

A system having a combinatorial weighing apparatus for obtaining an optimum weight of a batch of articles that exhibit a variable apparent specific gravity, and for packaging the weighed out articles in a packaging vessel. The system includes a volume detecting unit for detecting the volume of the articles supplied, a density detecting unit for detecting the density of the articles based on the volume value obtained from the volume detecting unit and a weight value obtained from the weighing apparatus, and a target weight adjusting unit for adjusting a target weight value within preset allowable limits on the basis of the detected density in such a manner that the volume of the articles discharged into the packaging vessel becomes substantially constant. The system is also provided with a crusher for adjusting the size of individual articles on the basis of the detected density in such a manner that the density of the articles becomes substantially constant.

10 Claims, 15 Drawing Figures

COMBINATORIAL WEIGHING METHOD AND APPARATUS WITH VOLUME AND DENSITY SENSING

BACKGROUND OF THE INVENTION

This invention relates to an automatic weighing apparatus and method wherein the weight and volume of articles in a package can be held within preset allowable limits.

Some articles, such as cornflakes and potato chips, experience widely different degrees of swelling because of such processing conditions as applied temperature and material mixture. Such articles therefore differ in shape and size and vary greatly in apparent specific gravity. They also tend to crumble. When weighing out these articles and then packaging them, there are instances where the volume of the packaged product is too large or too small, even though the weight of the articles in the bag or package is equal to a target value or closest to the target value within preset limits. In other words, the change in volume of the packaged articles is inversely proportional to the change in apparent specific gravity. Since the capacity of a package receiving the articles generally is fixed, too small a product volume in comparison with the package size gives the consumer the impression of a weight shortage. On the other hand, too large a product volume can lead to an improper seal because the package will be too full, and can cause the articles to overflow from the package and impair the packaging process. Accordingly, in weighing out articles, it is required that both the volume and weight of the articles introduced into a package be held within preset allowable limits.

SUMMARY OF THE INVENTION

An object of the present invention is to provide an automatic weighing apparatus and method wherein both the weight and volume of articles in a package can be held within preset allowable limits.

Another object of the present invention is to provide an automatic weighing apparatus and method wherein, in weighing out articles to a fixed weight and then packaging the articles, the volume of the articles within the package is also fixed to avoid an unexpected volumetric excess when the packaging operation is carried out, thereby permitting the packaging process to proceed smoothly by preventing the articles from overflowing from the package.

According to the present invention, the foregoing objects are attained by providing an automatic weighing system having a device for detecting the density of weighed articles, and a device for adjusting a target weight value on the basis of the density detected. In an embodiment, the system further includes a device for adjusting the size of individual articles on the basis of the detected density in such a manner that the density of the articles becomes substantially constant.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
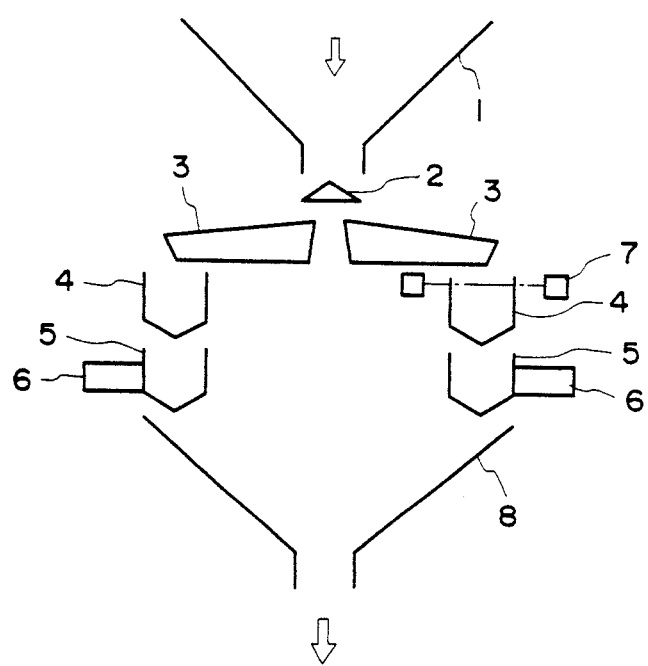
FIG. 1 is a diagrammatic view showing the construction of a combinatorial weighing apparatus according to the present invention.

FIG. 1 is a diagrammatic view of the overall construction of a combinatorial weighing apparatus according to the present invention. Articles to be weighed are supplied to each of n-number of circularly arrayed weighing stations from a supply chute 1. Each weighing station comprises a radial trough 3, a pool hopper 4 underlying the radial trough, a weighing hopper 5 underlying the pool hopper 4, and a weight sensor 6 provided on the weighing hopper 5. Each of the pool hoppers 4 is provided with a level sensor 7 for sensing the volume of the group of articles supplied by the corresponding radial trough 3. When these articles are released from the pool hopper 4 into the corresponding weighing hopper 5, the corresponding weight sensor 6 measures the weight of the article batch. More specifically, the supply chute 1 supplies the articles to a dispersng table 2, which in turn disperses the articles radially outward to be received by the underlying radial troughs 3. When the radial troughs 3 supply the articles to the corresponding underlying pool hoppers 4, the volume of the supplied articles is sensed. The articles are subsequently supplied to the corresponding underlying weighing hopper 5 where the articles are weighed. Thereafter, the articles in the weighing hoppers selected by a combinatorial computation are discharged from these weighing hoppers into a discharge chute 8, where the articles are delivered to a packaging machine in order to be packaged.

Figure 2:
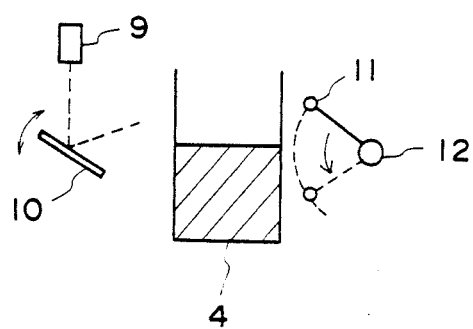
FIGS. 2(a), 2(b) and 2(c) are schematic views each showing an embodiment of a level sensor according to the present invention.
Figure 2:
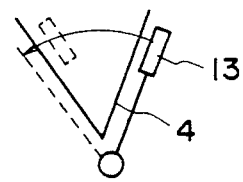
Figure 2:
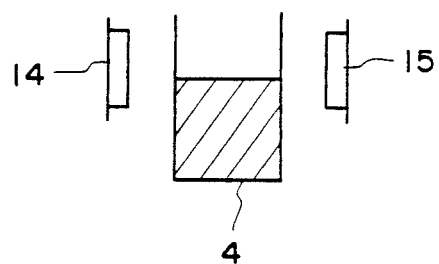

FIG. 2 illustrates three specific examples of a device for detecting the level of the articles with which the pool hoppers 4 are supplied. In FIG. 2(a), a laser beam emitted from a projector 9 is received by a light-receiving element 11 upon being reflected by a mirror 10. Meanwhile, the mirror 10 and light receiving element 11 are rotated synchronously to move the reflected laser beam up and down to determine the level of the articles within the pool hopper 4. More specifically, the light-receiving element 11 is rotated back and forth by a stepping motor 12 in sync with the back-and-forth rotation of the mirror 10. When the laser beam, reflected by the mirror 10 and then received by the light-receiving element 11, is interrupted by the batch of articles inside the pool hopper 4, the level of the article batch is calculated from the rotational angle of the stepping motor 12 at such time. In FIG. 2(b), an image sensor 13 is employed as a light-receiving element. The sensor 13 is set so as to extend substantially vertically and is moved transversely along the side of the corresponding pool hopper 4 to detect the level of the article batch at individual points in the path of movement. In FIG. 2(c), a planar light beam projector 14 and a light-receiving element 15 are disposed to face each other on either side of the pool hopper 4, with the level of the article batch in the pool hopper being found from the quantity of light received by the element 15. A solar battery having a rectangular configuration can be employed as the light-receiving element 15, or an array of phototransistors can be used. An attenuation in the quantity of light from the projector 14 must be taken into account if the solar battery arrangement is adopted. To this end, two light-receiving elements are provided to serve as the element 15, one being for detecting a reference light quantity, the other being for actual measurement. Outputs from these two elements are applied to a differential amplifier the output whereof is subjected to an A/D conversion to obtain the article level.

When the level of the articles supplied to each of the pool hoppers 4 is found in the above-described manner, the volume of each article batch is calculated from the article level. There are two methods of supplying articles to the pool hoppers 4. In the first method, the radial troughs 3 are rendered operational until the articles introduced into the corresponding pool hoppers 4 reach a certain level within the pool hopper. Though the arrangement for detecting the articles supplied is simple, the period during which articles are supplied is somewhat arbitrary. In the second method, the radial troughs 3 are always operated for a constant period of time irrespective of an excess volume of supplied articles. Since the period of time during which the articles are supplied is constant, it is easy to periodically perform weighing at a fixed time during the cycle. However, the arrangement for detecting the level of articles supplied is more complicated.

Thus, the first method is based on supplying the pool hoppers with a predetermined, fixed volume of the articles, while the second method is based on supplying the pool hoppers with articles for a predetermined period of time. Though both methods are applicable, the arrangement for computing the volume of supplied articles differs depending upon the method chosen.

Figure 3:
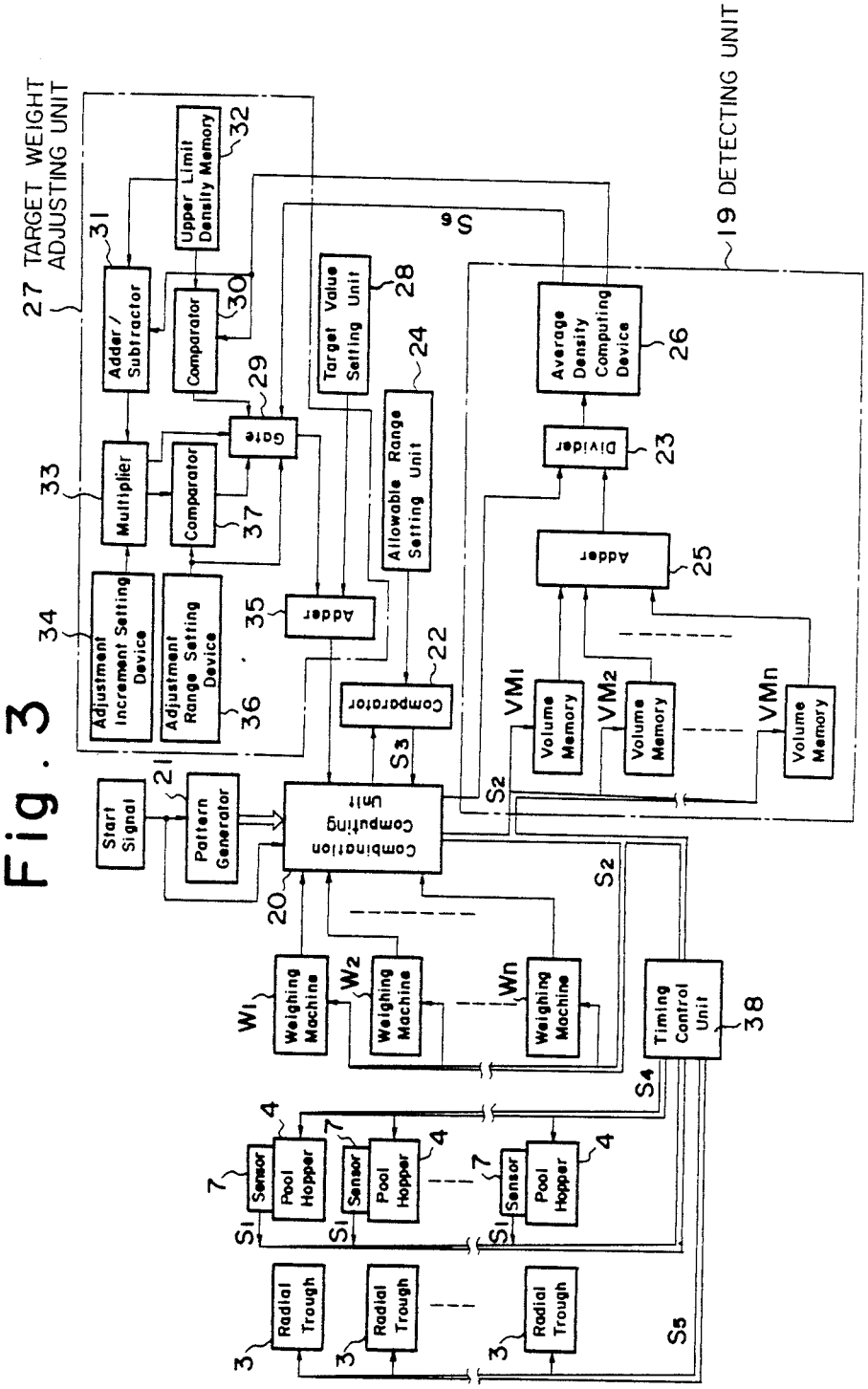
FIG. 3 is a block diagram of an embodiment of the combinatorial weighing apparatus shown in FIG. 1.

FIG. 3 is a block diagram of an embodiment of the combinatorial weighing apparatus shown in FIG. 1 for a case where the apparatus is adapted to supply articles according to the first method described above. In FIG. 3, n-number of weighing machines W1 through Wn each comprise the weight sensor 6 and associated weighing hopper 5 of FIG. 1. All of the pool hoppers 4 are provided with corresponding level sensors 7. The radial troughs 3 operate to supply the corresponding pool hoppers 4 with articles, with operation continuing until the corresponding level sensors 7 issue a detection signal S1. When the articles supplied pile up to attain a predetermined level, the detection signal S1 is delivered to a timing control unit 38, described below, whereby the supply of articles is terminated. In this manner the volume of the articles supplied to each of the pool hoppers 4 attains a predetermined value each and every cycle. With this arrangement, since the weighing apparatus is of the combinatorial type, it is required that the quantity of articles supplied to the pool hoppers 4 be made to differ from one pool hopper to another. Therefore, the levels to be detected by the level sensors are different for each weighing station. Further, since the volume of articles supplied to each pool hopper 4 each cycle is predetermined and constant in the illustrated embodiment, a detecting unit 19, described below, is provided with volume memories VM1 through VMn which store the various levels in terms of volume.

Each weighing machine W1 through Wn is adapted to respond to a discharge command signal S2 from a combination computing unit 20 by discharging its articles into the corresponding weighing hopper 5. Then, weighing hopper 5, which are emptied after passage of a predetermined length of time, are supplied with articles from the overlying pool hoppers 4, and the weights of the corresponding article batches are weighed by the weighing machines W1 through Wn. The weighing machines W1 through Wn produce outputs serving as weight data (weight values) $w_1$ through $w_n$. These items of weight data enter the combination computing unit 20 where they are sequentially formed into combinations in accordance with combination patterns obtained as an output from a pattern generator 21. The computing unit 20 then finds a single combination (referred to as the "optimum combination" hereinafter), the total weight whereof is equal to a target value or is closest to the target value. The optimum combination pattern and total weight value obtained are stored in memory, with the total weight value being delivered also to a comparator 22 and to a divider 23 in the detecting unit 19. The comparator 22 compares the total weight value with upper and lower limit values obtained from an allowable range setting unit 24 to check whether the total weight value falls within preset allowable limits. If it does, the comparator 22 delivers a signal S3, indicative of the fact that the weight is within the preset allowable limits, to the combination computing unit 20, which responds to applying the discharge command signal S2 to those weighing machines W1 through Wn corresponding to the optimum combination pattern stored in the computing unit 20.

The discharge command signal S2 is applied also to the detecting unit 19. The signal, which acts as a read signal, enters the volume memories VM1 through VMn that correspond to the weighing machines W1 through Wn selected by the optimum combination. Volume data $V_1$ through $v_n$ read out of these volume memories in response to the signal S2 are applied to an adder 25, where the volume of the article batches corresponding to the optimum combination is computed and applied to the divider 23. Here the density of the articles is computed from the volume data and total weight value, which is the total of the combined weight values constituting the optimum combination, as described above. The density data obtained in this fashion is sampled once per cycle or once every several cycles so that the average density may be computed by an average density calculating device 26.

A target weight adjusting unit 27 increases or decreases the aforementioned target weight value in the weighing section within the preset allowable limits in such a manner that the volume of the articles charged into a prescribed packaging vessel remains substantially constant. More specifically, the target weight value, namely the total weight of the article batch desired to be weighed out by the apparatus, is preset and stored in the target value setting unit 28. In a case where the number of times the average density is sampled is less than a predetermined number, the average density calculating device 26 produces a control signal S6 which holds a gate 29, in the target weight adjusting unit 27, closed. As a result, no change in the target weight value takes place. In other words, the initial value, namely the value within the target value setting unit 28, is delivered to the combination computing unit 20 through an adder 35 without being adjusted. When the number of data for computing average density reaches a predetermined value to assure that the average density is reliable, the target weight value is adjusted within the target weight adjusting unit 27 on the basis of the average density. The criterion for judging the reliability of the average density may be understood as being a certain fixed number of weighing operations in a case where all weighing stations are provided with level sensors 7, as in the arrangement of FIG. 3. In other words, the number of weighing cycles are counted starting from the initial cycle. When the counted number reaches the fixed number, the average density is deemed to have the desired reliability. In a case where only some of the weighing stations are provided with the level sensors 7, as in a later embodiment, the average density is judged to be reliable when a predetermined number of data have entered a shift register located within the average density calculating device 26.

When the average value attains reliability in this fashion, the target weight value is adjusted in the target weight adjusting unit 27 as described above. Specifically, the average density from the average density calculating device 26 is applied to a comparator 30 in the target weight adjusting unit 27. The comparator 30 compares the average density with a value stored in an upper limit density memory 32 and disables the gate 29 if the average density is found to be less than the stored value. The upper limit density memory 32 is a device in which there is set and stored the upper limit value of the proper density, namely the upper limit of a density for which processing to change the target value need not be executed. If the average density does not exceed this upper limit, then operation proceeds on the assumption that the average density is of the proper value, and no processing to adjust the target weight value is carried out. When the average density exceeds the upper limit, however, the target weight value is adjusted on the basis of the average density in the following manner. Specifically, an adder/subtractor 31 computes the difference between the average density and the value in the upper limit density memory 32, and applies the computed difference to a multiplier 33. The latter computes the product between the output of the adder/subtractor 31 and a value in an adjustment increment setting device 34, and applies the product to an adder 35 through a gate 29. The adjustment increment setting device 34 stores a certain constant for changing the target weight value in step-by-step fashion in accordance with density. For example, to change the target weight value by 0.2 g with respect to a density of 0.1 g/cm$^3$, "2" is stored in the device 34. If the target weight value is to be changed to 0.1 g with respect to a change in density of 1 g/cm$^3$, then 0.1 is set in the device 34. An adjustment range setting device 36 stores an allowable range within which it is permissible to change the target weight value. For example, if 100 g is the lower limit and it is permissible to change the target weight value up to 105 g, then a value corresponding to b 5 g is stored in the device 36. The value in the multiplier 33 and the value in the adjustment range setting device 36 are compared in a comparator 37. If the former is found to be larger, the value in the adjustment range setting device 36, namely the upper limit value of the allowable range, is applied to the adder 35 through the gate 29. If the foregoing condition is found not to hold, then the value in the multiplier 33 is applied to the adder 35 through the gate 29. Thus, the adder 35 receives as inputs the value set in the target value setting unit 28 and either the value from the multiplier 33 or the value from the adjustment range setting device 36. The sum computed by the adder 35 serves as the target value of the combinatorial weighing operation. Accordingly, the combination computing unit 20 selects, from among the combinations of weight value data $w_1$ through $w_n$, the optimum combination, namely the combination giving a total weight value equal or closest to this target value.

The discharge command signal S2, which is delivered to those of the weighing machines W1 through Wn constituting the optimum combination from the combination computing unit 20, is simultaneously applied to a timing control unit 38 which, in response, delivers a discharge command signal S4 and an operation command signal S5, described below, to the pool hoppers 4 and radial troughs 3, respectively, the operating periods whereof are controlled thereby. More specifically, the discharge command signal S2 is applied to the weighing hoppers 5 of those weighing machines W1 through Wn selected by the optimum combination from the combination computing unit 20, and to the timing control unit 38. A fixed period of time after the signal arrives, the timing control unit 38 sends the discharge command signal S4 to the pool hoppers 4 of the weighing machines selected by the optimum combination and then, upon passage of a fixed period of time, sends the operation command signal S5 to the radial troughs 3 of the weighing machines selected by the optimum combination. As a result of these operations, the weighing hoppers 5 of the selected weighing machines discharge their articles and are left empty owing to the discharge signal S2, after which the pool hoppers 4, corresponding to the emptied weighing hoppers 5, discharge their articles in response to the discharge command signal S4 to resupply the weighing hoppers. When the corresponding level sensors 7 detect the article level and produce the detection signal S1, the signal is received by the timing control unit 38, which responds by terminating the delivery of the operation command signal S5 applied to the radial troughs 3, so that the troughs stop supplying articles. These weighing steps, performed by the combinatorial weighing apparatus, are repeated in like fashion to weigh out articles in accordance with the first method, which is based on supplying the pool hoppers 4 with a predetermined, fixed volume of the articles.

Figure 4:
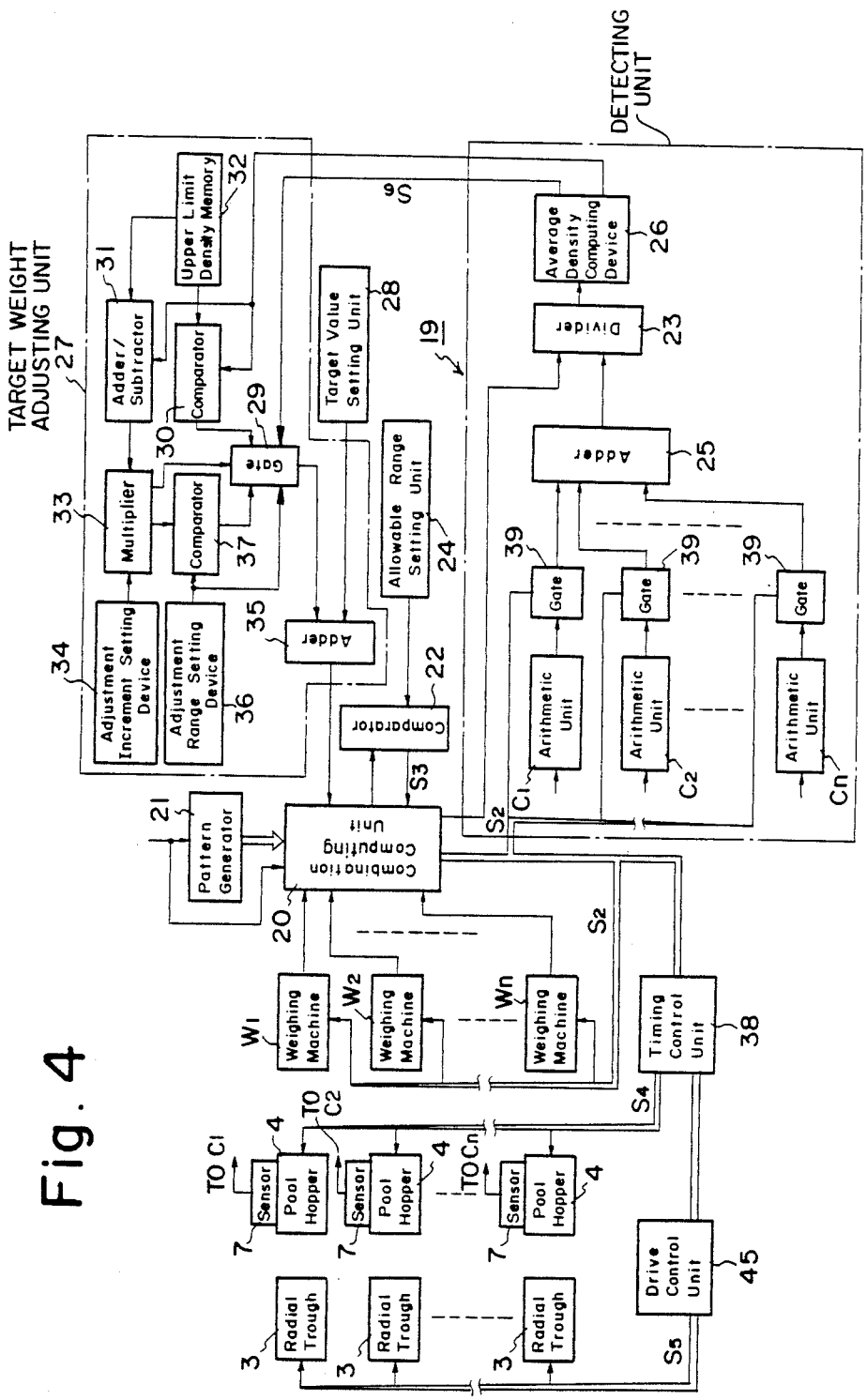
FIG. 4 is a block diagram of another embodiment of the combinatorial weighing apparatus shown in FIG. 1.

FIG. 4 is a block diagram of an embodiment of the combinatorial weighing apparatus shown in FIG. 1 for a case where the apparatus is adapted to supply articles according to the second method described above, namely the method based on supplying the pool hoppers 4 with articles for a predetermined period of time. In FIG. 4, all of the pool hoppers 4 are provided with the level sensors 7 for detecting the height of the articles supplied to the corresponding pool hoppers 4 by operating the corresponding radial troughs 3 for a fixed period of time. The detected levels are applied to corresponding arithmetic units C1 through Cn each of which computes and stores the volume of the articles supplied to the corresponding pool hopper 4. Next, as described above in connection with FIG. 3, the weighing machines W1 through Wn weigh their articles, the combination computing unit 20 selects the weighing machines which combine to form the optimum combination, and the combination of the articles contained in the weighing machines selected is delivered to the comparator 22 and the divider 23. If the comparator 22 finds the total weight value to be within the preset allowable limits, the combination computing unit 20 applies the discharge command signal S2 to those of the weighing machines W1 through Wn constituting the optimum combination, and to the timing control unit 38. The discharge command signal S2 is applied to gate circuits 39, in the detecting unit 19, to open these circuits for delivering the outputs of the corresponding arithmetic units C1 through Cn. Each output, which is an item of data indicating the computed volume of the articles supplied to the corresponding pool hopper 4 of the corresponding weighing machine in the optimum combination, is applied to the adder 25 through the corresponding gate 39. Then, as in FIG. 3, the divider 23 computes the density of the articles from the total of the weight values in the optimum combination and from the summed volume data provided by the adder 25. The target weight value is adjusted by the target weight adjusting unit 27 based on the average density computed in the average density computing device 26 on the basis of the density data. Specifically, as in FIG. 3, the target weight value, namely the total weight of the articles batch desired to be weighed out by the apparatus, is preset and stored in the target value setting unit 28. The target weight value adjustment is performed, if necessary, when the number of data for computing average density reaches a predetermined value to assure that the average density is reliable. In a case where the number of times the average density is sampled is less than a predetermined number, the initially set value, namely the value in the target value setting unit 28, is used as the target weight value. Accordingly, upon attaining reliability, the average density is delivered from the average density calculating device 26 to the target weight adjusting unit 27, where the target weight value is adjusted. Thereafter, the target weight value is applied to the combination computing unit 20 so that combinations may be computed based on this value. The mechanism for adjusting the target weight value is the same as in the arrangement of FIG. 3. Thus, the comparator 30 compares the average density with the value in the upper limit density memory 32. If the average density does not exceed the upper limit density, processing for changing the target value is not performed. If the upper limit density is exceeded, however, then the adder/subtractor 31 computes the difference between the average density and the value stored in the upper limit density memory 32, with the result of the computation being delivered to the multiplier 33 at the same time. The multiplier 33 multiplies the output of the adder/subtractor 31 by the value in the adjustment increment setting device 34 and delivers the product, which is compared in the comparator 37 with the value in the adjustment range setting device 36. The smaller of the two values is thereafter delivered to the adder 35 through the gate 29. Thus, the adder 35 adds the adjustment factor to the initially set value, namely the value in the target value setting unit 28, with the output of the adder serving as the target value for a combinatorial computation. Using this value, the combination computing unit 20 selects whichever of the weighing machines W1 through Wn make up the optimum combination.

The timing control unit 38 sends the discharge command signal S4 to the pool hoppers 4 of the weighing machines selected by the optimum combination, and sends the operation command signal S5 to the corresponding radial troughs 3, thereby controlling the operating time of these units. In this embodiment, the operation command signal S5 for the radial troughs 3 is delivered through a drive control unit 45 to control the period of time during which the radial troughs 3 operate. Specifically, the radial troughs 3 supply articles to the corresponding pool hoppers 4 while the operating time of the troughs is controlled by the drive control unit 45 in such a manner that each trough operates for a length of time different from the other troughs. These weighing steps performed by the combinatorial weighing apparatus are repeated in like fashion to weigh out articles in accordance with the second method, which is based on supplying the pool hoppers 4 with articles for a predetermined period of time.

Figure 5:
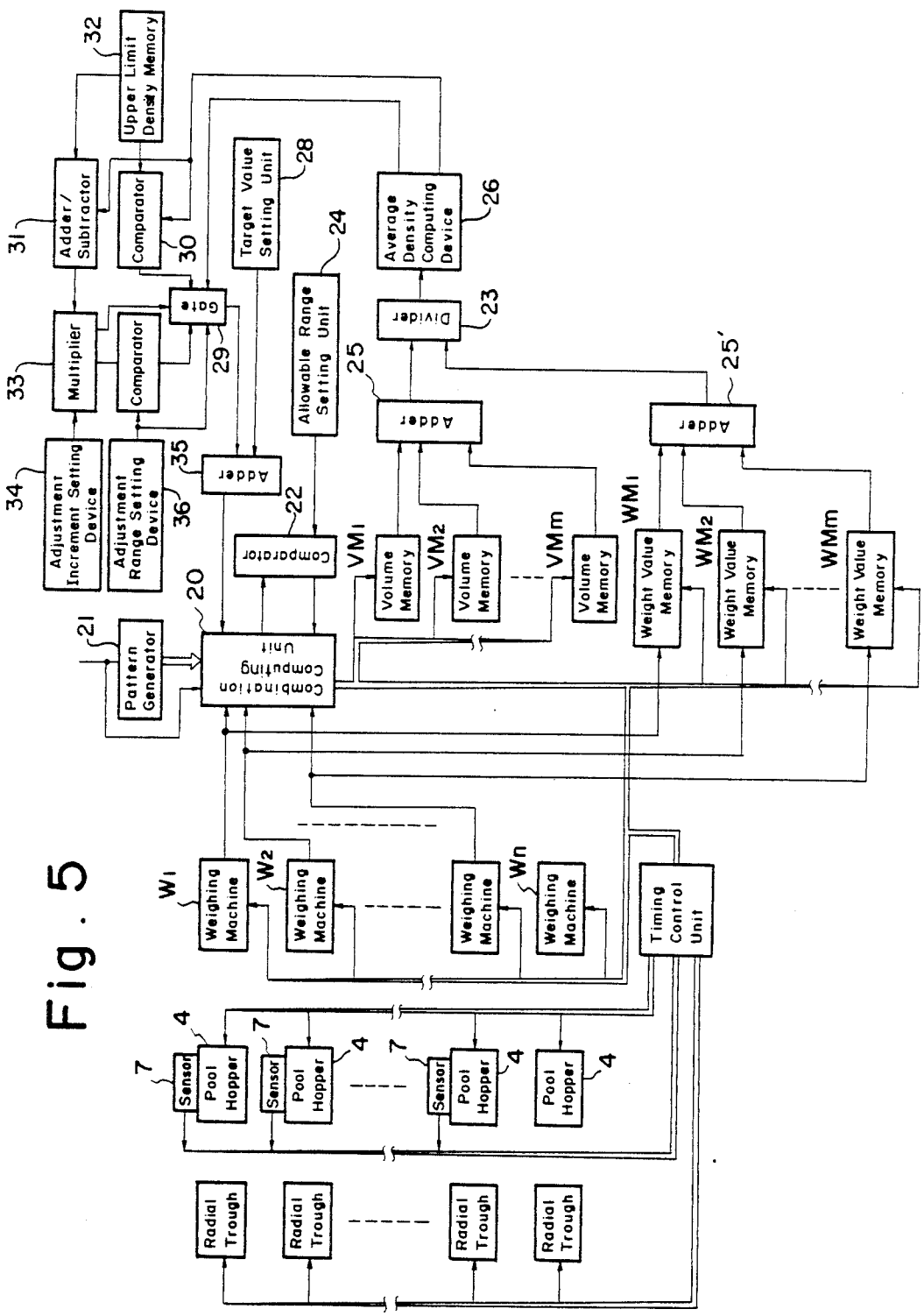
FIG. 5 is a block diagram of an arrangement wherein some of a plurality of pool hoppers in the embodiment of FIG. 3 are provided with respective level sensors.

FIG. 5 is a block diagram of an arrangement wherein only some of the of pool hoppers 4 in the embodiment of FIG. 3 are provided with the level sensors 7. Specifically, a level sensor is provided on m-number of the pool hoppers 4, where $m \leq n$. With such an arrangement, the total of a weight combination computed by the combination computing unit 20 cannot be used to compute density. Therefore, volume memories VM1, VM2, ... VMm are provided for corresponding ones of the m pool hoppers 4 equipped with the respective level sensors 7, and weight memories WM1, WM2, ... WMm are separately provided for the weighing machines W1, W2, ... corresponding to these pool hoppers. Among the weighing machines W1, W2 ... selected by the optimum combination, only the weight data from those weighing machines W1, W2, ... whose pool hoppers 4 are equipped with the level sensors 7 are read out of the weight memories WM1 through WMm and added for the purpose of computing density. Meanwhile, among the pool hoppers 4 equipped with the level sensors 7, only the volume data from those pool hoppers 4 corresponding to the selected weighing machines W1, W2 ... are read out of the volume memories VM1, VM2 ... VMm and added by an adder 25'. The operation of this embodiment from this point onward is similar to that of the arrangement shown in FIG. 3, and the associated circuitry is the same. However, the operation of the radial troughs corresponding to the pool hoppers not provided with level sensors is halted by a timing control operation.

In a case where the apparatus embodied in FIG. 4 has the level sensors 7 provided on only some of the pool hoppers 4, the weight value memories WM1, WM2, . . . WMm are provided in a similar fashion, and operation proceeds in a manner similar to that described above.

Figure 6:
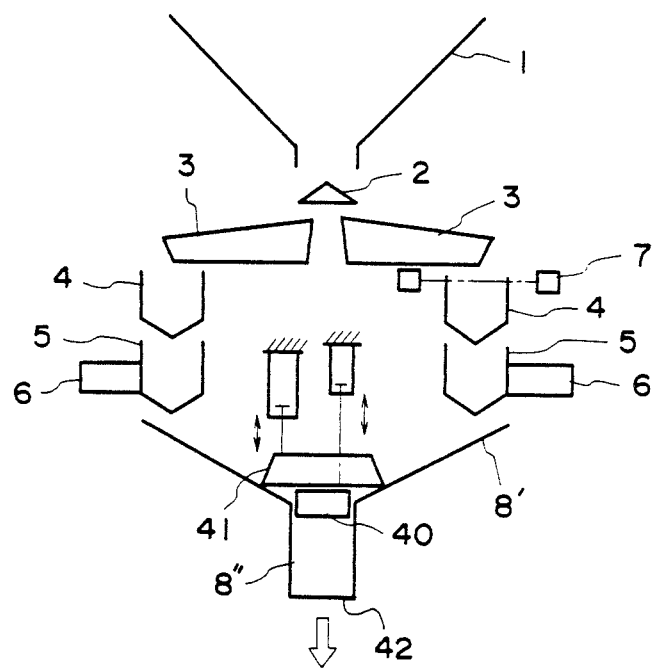
FIG. 6 is a diagrammatic view showing the construction of a combinatorial weighing apparatus additionally provided with means for shaping weighed articles into a fixed volume.
Figure 7:
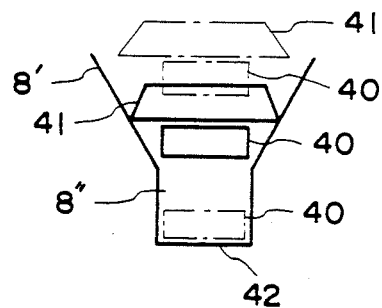
FIG. 7 is a view useful in describing the operation of the fixed volume shaping means shown in FIG. 6.

FIG. 6 is a diagrammatic view of the construction of the combinatorial weighing apparatus of FIG. 1 when additionally provided with means, including a conditioner 40, for shaping weighed articles into a fixed volume. As shown in FIG. 6, the shaping means comprises a collecting chute 8', the conditioner 40 adapted to reciprocate inside a cylinder 8" formed at the lower end portion of the chute 8', a ring shutter 41 partitioning the upper part of the chute 8' from the lower part thereof, a gate plate 42, and a control unit 43 (FIG. 8) for controlling the ring shutter 41, conditioner 40 and gate plate 42. The gate plate 42 is adapted to open and close a discharge port at the lower end of the collecting chute 8' in response to a command from the control unit 43. The conditioner 40 and ring shutter 41 are adapted to be driven up and down by a suitable drive mechanism controlled by the control unit 43. In accordance with the command from the control unit 43, the gate plate 42 is made to close the chute discharge port, the ring shutter 41 is moved to its lowermost position, and the conditioner 40 is moved to its uppermost position, as shown by the solid lines in FIG. 7. In this way, two batches of articles selected by respective optimum combinations and discharged successively from the weighing hoppers may be separated within the collecting chute 8' by the ring shutter 41, one batch being collected below the ring shutter, the other above. When this has been accomplished, the conditioner 40 is lowered to shape or compress the lower batch of articles into a fixed volume irrespective of average density. This is followed by causing the gate plate 42 to open the collecting chute discharge port, and lowering the conditioner 40 to its lowermost position so that the lower article batch will be discharged into a packaging machine. When the articles have been so discharged, the gate plate 42 is moved to close the collecting chute discharge port, and both the conditioner 40 and ring shutter 41 are raised to their uppermost positions so that the next batch of articles, heretofore held in the upper part of the collecting chute 8' by the ring shutter 41, will drop into the lower end portion of the collecting chute. Then, with the conditioner 40 at its uppermost position, the ring shutter 41 is moved to its lowermost position, after which the selected weighing hoppers 5 are opened to release the next batch of articles into the collecting chute 8', with the articles piling up on the ring shutter 41. By repeating these steps, batches of the articles are collected in the chute 8' one after another and formed into the predetermined volume before discharge from the collecting chute.

Figure 8:
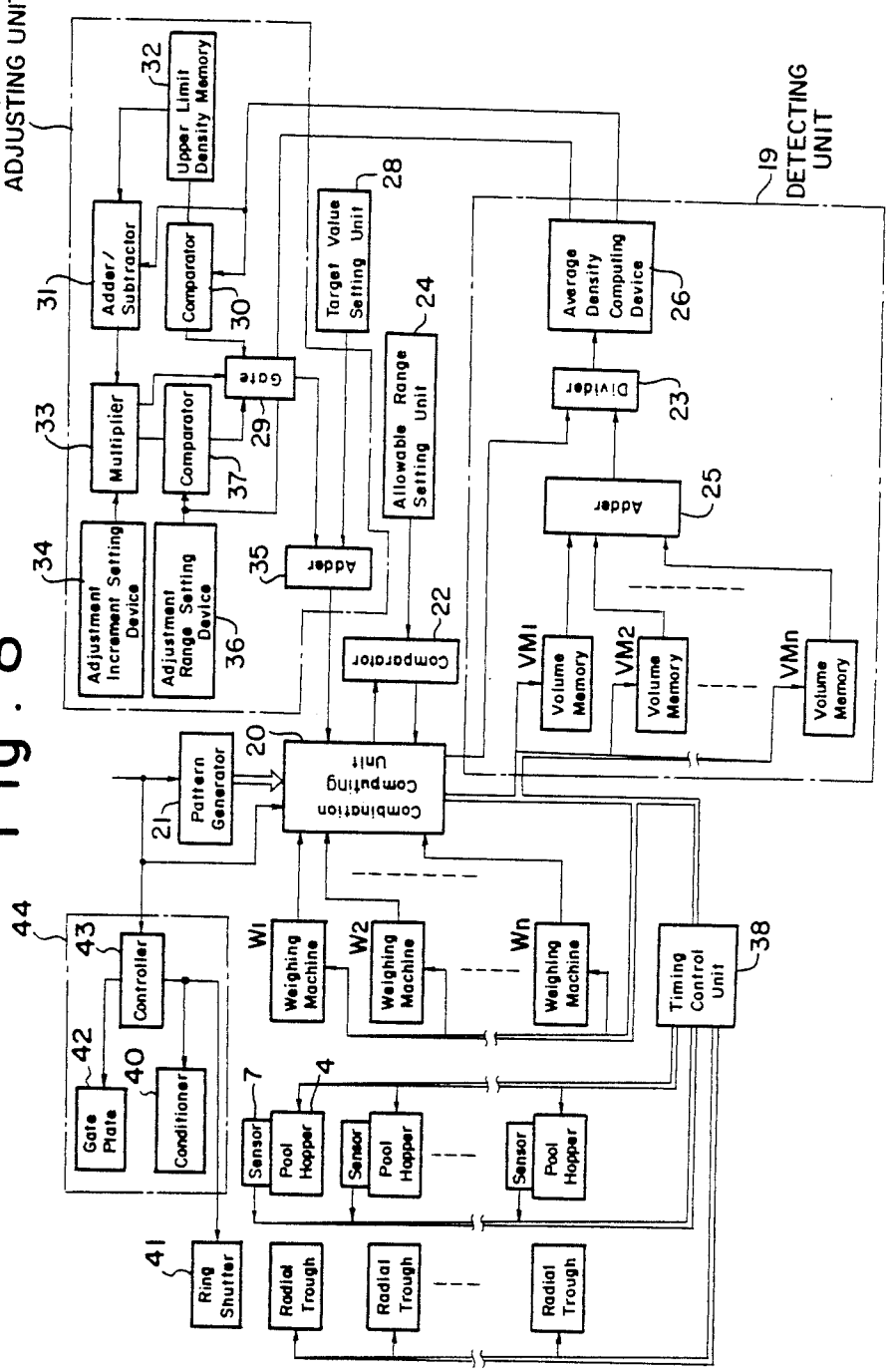
FIG. 8 is a block diagram of an embodiment of the combinatorial weighing apparatus shown in FIG. 6.

FIG. 8 is a block diagram of an embodiment of the combinatorial weighing apparatus shown in FIG. 6 for a case where the apparatus is adapted to supply articles according to the first method described above, namely the method in which the pool hoppers are supplied with a predetermined, fixed volume of the articles. The embodiment shown in FIG. 8 is obtained by providing the arrangement of FIG. 3 with the volume shaping means 44 described above. Articles weighed out as described hereinabove are shaped into a predetermined, fixed volume before being delivered to a packaging machine.

In another aspect of the present invention, the density of the articles in the weighing section of the combinatorial weighing apparatus is detected, and an adjustment unit is provided for adjusting the size of individual articles based on the detected density in such a manner that the density of the articles takes on a substantially constant, predetermined value. This will now be described with reference to FIGS. 9 through 13.

Figure 9:
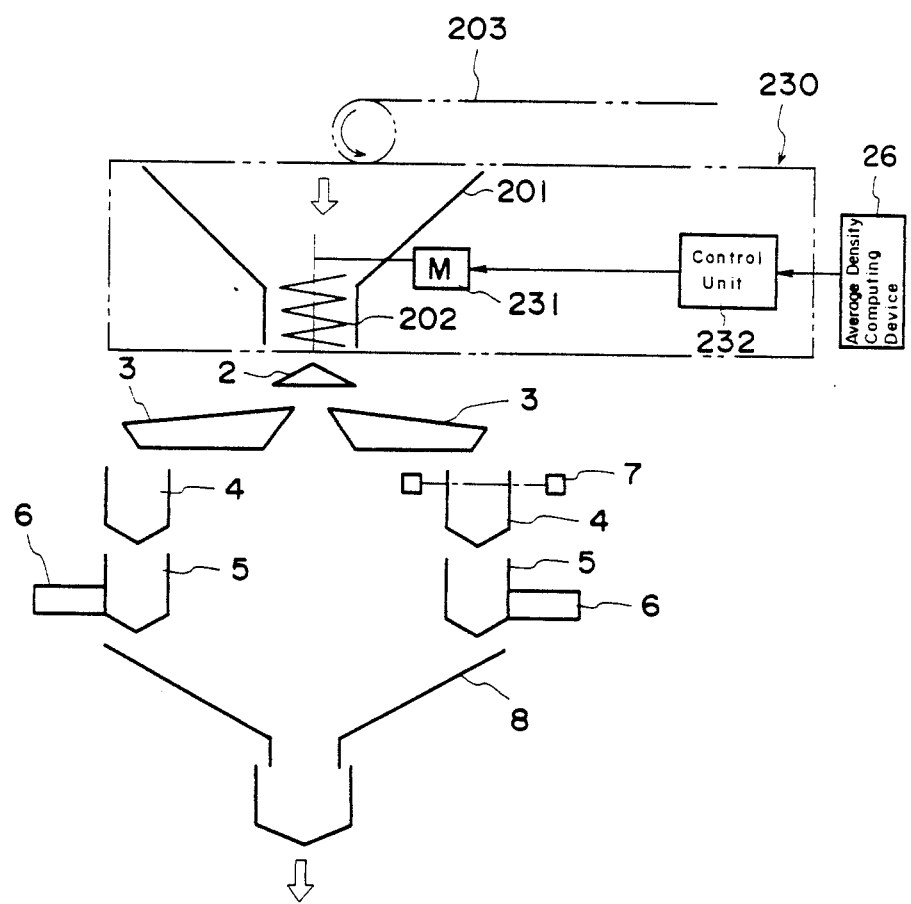
FIG. 9 is a diagrammatic view showing the construction of a combinatorial weighing apparatus additionally provided with means for adjusting the size of discrete or individual articles.

FIG. 9 is a diagrammatic view of the construction of a combinatorial weighing apparatus obtained by providing the apparatus of FIG. 1 with the aforementioned adjustment unit. The following discussion will deal primarily with the adjustment unit. Other portions corresponding to those shown in FIG. 1 are designated by like reference characters and are not described again in detail. In FIG. 9, a supply chute 201 is disposed above the weighing apparatus at the center thereof and receives articles delivered by a bucket conveyor 203. The chute 201 is adapted to supply these articles to each of the weighing stations of the apparatus. Provided at the lower opening of the supply chute 201 is a crusher 202, such as a screw, for crushing the articles delivered thereto. The crusher 202 is operated by a motor 231 controlled on the basis of a control signal received from a controller 232, described below. The size of the individual articles is adjusted by the crushing action of the crusher 202.

Figure 10:
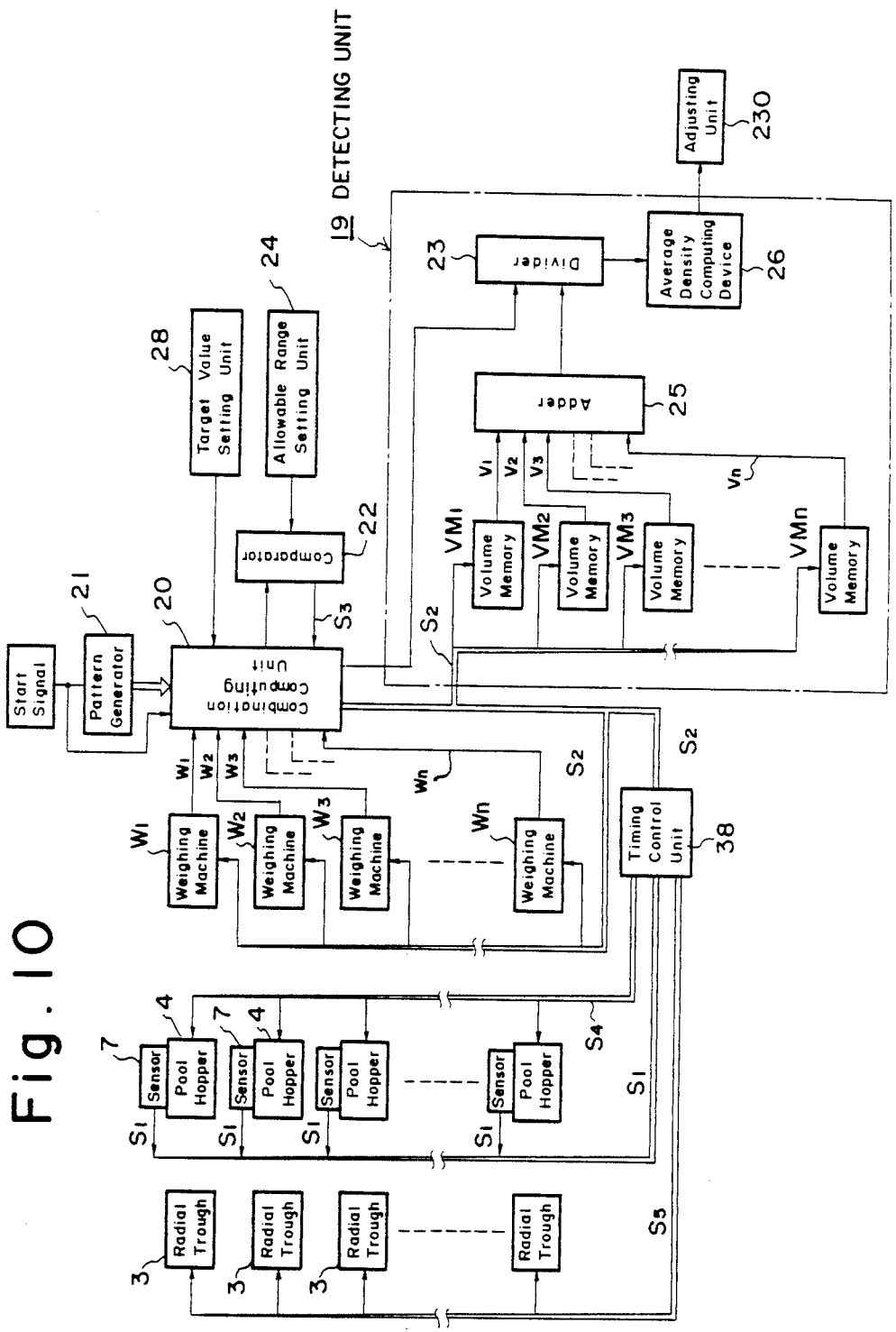
FIG. 10 is a block diagram of an embodiment of the combinatorial weighing apparatus shown in FIG. 9.

FIG. 10 is a block diagram of an embodiment of the combinatorial weighing apparatus shown in FIG. 9. The apparatus, which is provided with the unit for adjusting the size of the individual articles, operates in accordance with the first method based on supplying the pool hoppers with a predetermined, fixed volume of the articles. The discussion will focus on the size adjusting operation, with the descriptions of the weighing and density detecting sections being deleted to avoid prolixity.

The discharge command signal S2 is applied also to the detecting unit 19. The signal, which acts as a read signal, enters those volume memories VM1 through VMn that correspond to the weighing machines W1 through Wn selected by the optimum combination. Volume data $v_1$ through $v_n$, read out of these volume memories in response to the signal S2, are applied to an adder 25, where the volume of the articles batches corresponding to the optimum combination is computed and applied to the divider 23. Here the density of the articles is computed from the volume data and total weight value, which is the total of the combined weight values constituting the optimum combination received from the combination computing unit 20. The density data obtained in this fashion is sampled once per cycle or once every several cycles so that the average density may be computed by an average density computing device 26. Based on the calculated average density, the adjustment unit 230 adjusts the size of the individual articles in such fashion that the density of the articles becomes substantially constant.

As shown in FIG. 9, the adjustment unit 230 comprises the supply chute 201, the crusher 202 provided inside the supply chute, the motor 231 for driving the crusher, and the controller 232 for controlling the motor. The crusher 202 is driven continuously and variably by the motor 231, the rotation whereof is regulated by the controller 232 based on the average density of the articles. This enables individual articles to be adusted in size.

Figure 11:
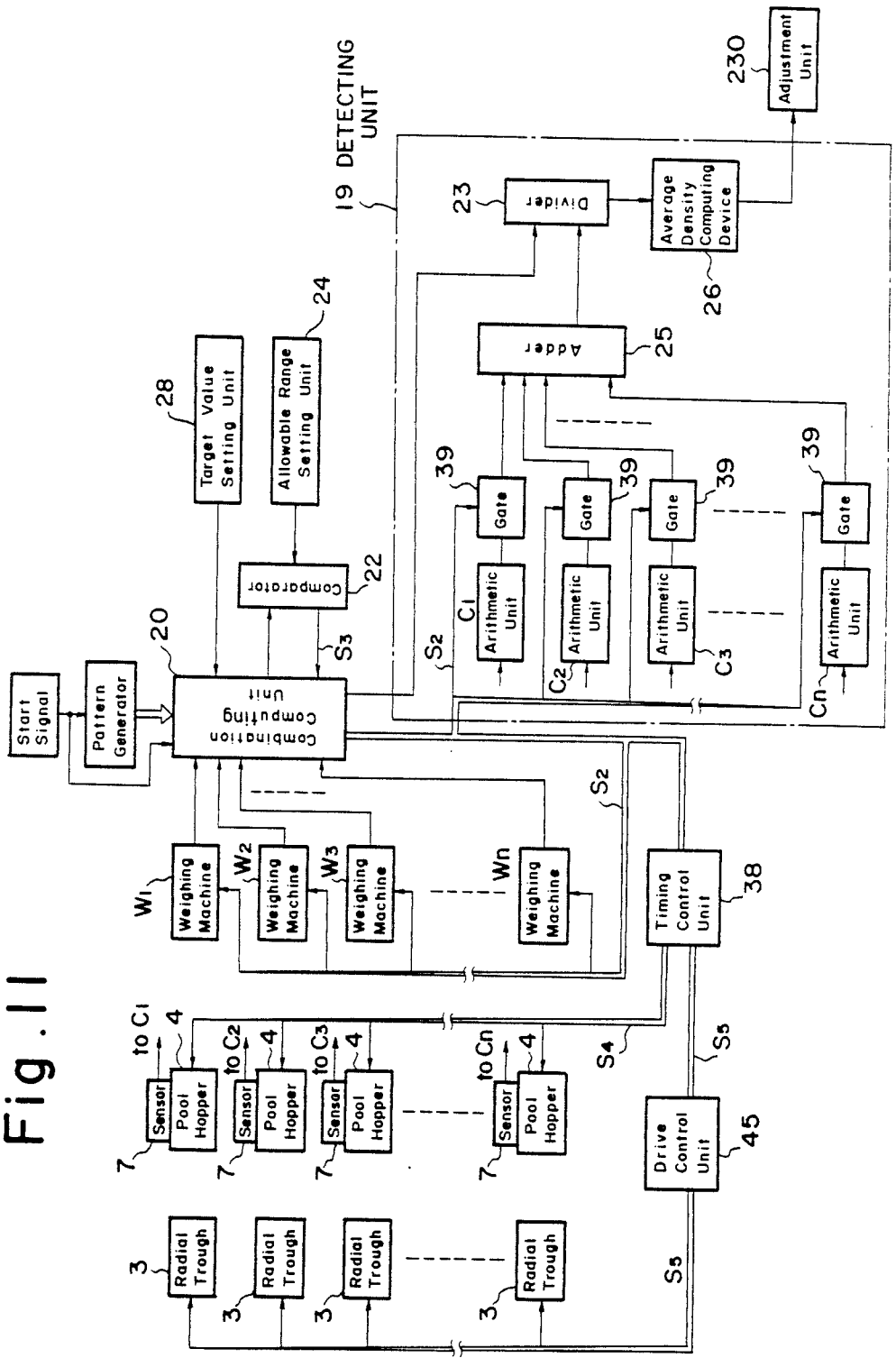
FIG. 11 is a block diagram of another embodiment of the combinatorial weighing apparatus shown in FIG. 9.

FIG. 11 is a block diagram of another embodiment of the combinatorial weighing apparatus shown in FIG. 9. The apparatus operates in accordance with the second method based on supplying the pool hoppers with articles for a predetermined, fixed period of time. Portions corresponding to those shown in the block diagram of FIG. 4 are designated by like reference characters and are not described in detail again. In FIG. 11, all of the pool hoppers 4 are provided with the level sensors 7 for detecting the height of the articles supplied to the corresponding pool hoppers 4 by operating the corresponding radial troughs 3 for a fixed period of time. The detected levels are applied to corresponding arithmetic units C1 through Cn each of which computes and stores the volume of the articles supplied to the corresponding pool hopper 4. Next, as described above in connection with FIG. 3, the weighing machines W1 through Wn weigh their articles, the combination computing unit 20 selects the weighing machines which correspond to the optimum combination, and the total of the weights contained in the weighing machines selected is delivered to the comparator 22 and divider 23. If the comparator 22 finds the total weight value to be within the preset allowable limits, the combination computing unit 20 applies the discharge command signal S2 to those of the weighing machines W1 through Wn constituting the optimum combination, and to the timing control unit 38.

The discharge command signal S2 is applied to gate circuits 39 in the detecting unit 19 to open these circuits for delivering the outputs of the corresponding arithmetic units C1 through Cn. Each output, which is an item of data indicating the computed volume of the articles supplied to the corresponding pool hopper 4 of the corresponding weighing machine in the optimum combination, is applied to the adder 25 through the corresponding gate 39. Then, as in FIG. 3, the divider 23 computes the density of the articles from the total of the weight values in the optimum combination and from the summed volume data provided by the adder 25. The individual articles are adjusted in size by the adjustment unit 230 based on the average density computed in the average density computing device 26 on the basis of the density data.

Figure 12:
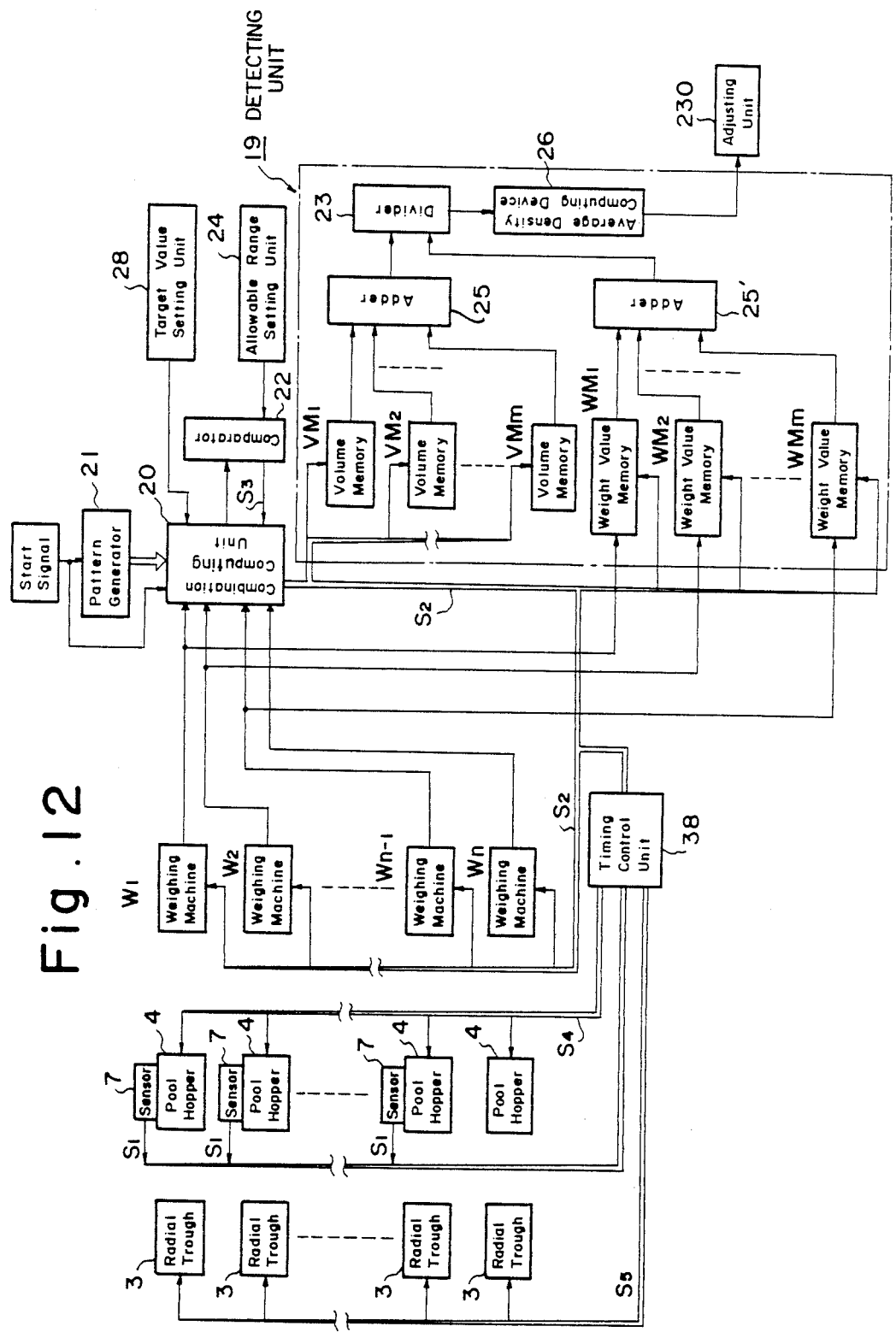
FIG. 12 is a block diagram of an arrangement wherein some of a plurality of pool hoppers in the embodiment of FIG. 10 are provided with respective level sensors.

FIG. 12 is a block diagram of an arrangement wherein only some of the of pool hoppers 4 in the embodiment of FIG. 10 are provided with the level sensors 7. Specifically, a level sensor is provided on m-number of the pool hoppers 4, where m≦n. With such an arrangement, the total of a weight combination computed by the combination computing unit 20 cannot be used to compute density. Therefore, volume memories WM1, VM2, ... VMm are provided for corresponding ones of the m pool hoppers 4 equipped with the respective level sensors 7, and the detecting unit 19 is provided with weight memories VM1, VM2, ... WMm for respective weighing machines W1, W2, ... corresponding to these pool hoppers. Among the weighing machines W1, W2, ... selected by the optimum combination, only the weight data from those weighing machines W1, W2, ... whose pool hoppers 4 are equipped with the level sensors 7 are read out of the weight memories WM1 through VMm and added by the adder 25 for the purpose of computing density. As to volume, among the pool hoppers 4 equipped with the level sensors 7, only the volume data from those pool hoppers 4 corresponding to the selected weighing machines W1, W2 ... are read out of the volume memories VM1, VM2 ... VMm and applied to the adder 25' in response to the discharge signal S2.

Thus, as described above, among the weighing stations provided with the level sensors 7, the volume and weight data which are summed are obtained solely from the weighing stations selected by the optimum combination, after which the sums are applied to the divider 23 to compute density. From this point onward, operation proceeds as in the embodiments of FIGS. 10 and 11.

By providing any of the arrangements of FIGS. 10 through 12 with a target weight adjusting unit, the target weight can be increased or decreased, based on the detected density of the articles, within preset allowable limits in such a manner that the volume of the articles discharged into a package takes on a substantially constant, predetermined value. The construction of the target weight adjusting unit is illustrated in the block diagram of FIG. 13. As described above, the target weight setting unit 28 stores a set target value indicative of the weight of the articles desired to be weighed out by the combinatorial weighting apparatus. If the apparatus is to weigh out 100 g, for example, then a value corresponding to 100 g is set in the unit 28. The adjustment of the target weight value in the adjusting unit is performed when the number of data for computing averge density reaches a predetermined value to assure that the average density is reliable. Specifically, in a case where the number of times the average density is sampled is less than a predetermined number, an average density calculating device 329 produces a control signal S6' which holds a gate 340 closed. As a result, no change in the target weight value takes place. In other words, the initial value, namely the value within the target value setting unit 28, is delivered to the combination computing unit 20 through an adder 343 without being adjusted. The criterion for judging the reliability of the average density may be understood as being a certain fixed number of weighing operations in a case where all weighing stations are provided with level sensors 7. In other words, the number of weighing cycles are counted starting from the initial cycle. When the counted number reaches the fixed number, the average density is deemed to have the desired reliability. In a case where only some of the weighing stations are provided with the level sensors 7, the average density is judged to be reliable when a predetermined number of data have entered a shift register located within the average density calculating device 329. When the average value attains reliability in this fashion, the target weight value is adjusted in the target weight adjusting unit as described above. Specifically, the average density from the average density calculating device 329 is applied to a comparator 339. The comparator 339 compares the average density with a value stored in an upper limit density memory 338 and disables the gate 340 if the average density is found to be less than the stored value. The upper limit density memory 338 is a device in which there is set and stored the upper limit value of the proper density, namely the upper limit of a density for which processing to change the target value need not be executed. If the average density does not exceed this upper limit, then operation proceeds on the assumption that the average density is of the proper value. No processing to adjust the target weight value is carried out. When the average density exceeds the upper limit, however, the target weight value is adjusted on the basis of the average density in the the following manner. Specifically, an adder/subtractor 341 computes the difference between the average density and the value in the upper limit density memory 338, and applies the computed difference to a multiplier 342. The latter computes the product between the output of the adder/subtractor 341 and a value in an adjustment increment setting device 337, and applies the product to an adder 343 through the gate 340. The adjustment increment setting device 337 stores a certain constant for changing the target weight value in step-by-step fashion in accordance with density. For example, to change the target weight value by 0.2 g with respect to a density of 0.1 g/cm$^3$, "2" is stored in the device 337. If the target weight value is to be changed by 0.1 g with respect to a change in density of 1 g/cm$^3$, then 0.1 is set in the device 337. An adjustment range setting device 336 stores an allowable range within which it is permissible to change the target weight value. For example, if 100 g is the lower limit and it is permissible to change the target weight value up to 105 g, then a value corresponding to 5 g is stored in the device 336. The value in the multiplier 342 and the value in the adjustment range setting device 336 are compared in a comparator 344. If the former is found to be larger, the value in the adjustment range setting device 336, namely the upper limit value of the allowable range, is applied to the adder 343 through the gate 340. If the foregoing condition is found not to hold, then the value in the multiplier 342 is applied to the adder 343 through the gate 340. Thus, the adder receives, as inputs, the value set in the target value setting unit 28 and either the value from the multiplier 342 or the value from the adjustment range setting device 336. The sum computed by the adder 343 serves as the target value of the combinatorial weighing operation. Accordingly, the combination computing unit 20 selects, from among the combinations of weight value data $w_1$ through $w_n$, the optimum combination, namley the combination giving a total weight value equal or closest to this target value.

Figure 13:
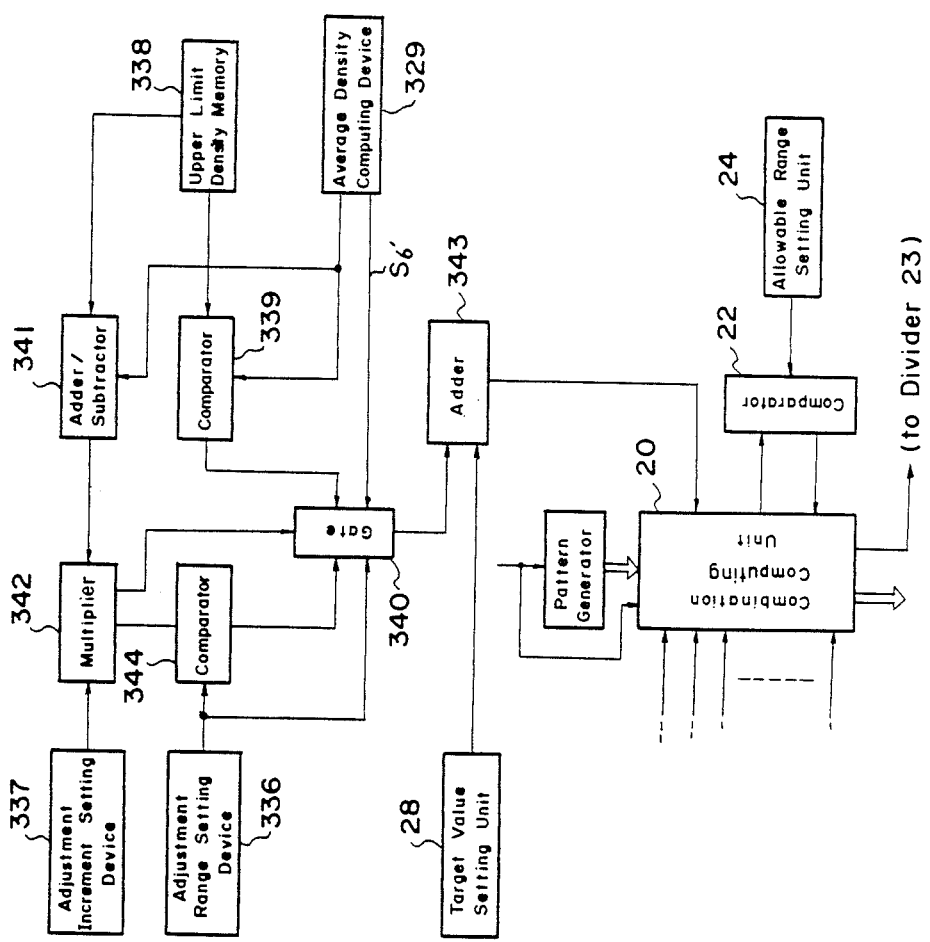
FIG. 13 is a block diagram of a target weight adjusting unit.

In the embodiment of FIG. 13, the target weight value is increased or decreased within preset allowable limits by the target weight adjusting unit in such fashion that the volume of the articles charged into a packaging vessel takes on a substantially constant value. The construction and operation of the weighing section, detecting unit and adjustment unit are as described hereinabove.

Thus, in cases where articles having an variable apparent specific gravity are to be weighed out and delivered to packaging vessels having a specified capacity, the present invention as described hereinabove makes it possible to hold both the weight and volume of each article batch within preset allowable limits. Therefore, when weighing out and packaging articles in batches each of which has a fixed weight, the volume of each batch within the packaging vessels will also be fixed. This makes it possible to avoid an unexpected volumetric excess caused by a variation in apparent specific gravity when the packaging operation is carried out, thereby preventing the articles from overflowing from the package. Accordingly, a batch of articles of a fixed weight will always have a volume suited to the specified capacity of the packaging vessel, thereby making it possible to prevent too small a product volume and, hence, the impression of a weight shortage. At the same time, too large a product volume can be avoided to preclude an improper seal and an obstruction to the packaging process caused by overflowing of articles from the package.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing apparatus having a weighing section for weighing out batches of articles, which exhibit a variable apparent specific gravity, to a weight value equal to a target weight value or closest to the target weight value within preset allowable limits, and for discharging the weighed out batches of articles in order that the batches of articles may be packaged in a packaging vessel, said apparatus comprising:
   volume detecting means, operatively connected to the weighing section, for detecting the volume of the batches of articles supplied to the weighing section and outputting a volume value;
   density detecting means, operatively connected to said volume detecting means and the weighing section, for detecting the density of the batches of articles from the volume value produced by said volume detecting means and the weight value produced by the weighing section; and
   target weight adjusting means, operatively connected to said density detecting means, for adjusting the target weight value within the preset allowable limits, on the basis of the detected density, in such a manner that the volume of the batches of articles discharged into the packaging vessel becomes substantially constant.

2. A combinatorial weighing apparatus having a weighing section for weighing out batches of articles, which exhibit a variable apparent specific gravity, to a weight value equal to a target weight value or closest to the target weight value within preset allowable limits, and for discharging the weighed out batches of articles in order that the batches of articles may be packaged in a packaging vessel, said apparatus comprising:
   shaping means, operatively connected to receive the weighed out batches of articles, for shaping the weighed out batches of articles into a batch of a prescribed, constant volume and for delivering the batch of shaped articles to the packaging vessel;
   volume detecting means, operatively connected to the weighing section, for detecting the volume of the batches of articles supplied to the weighing section and outputting a volume value;
   density detecting means, operatively connected to said volume detecting means, for detecting the density of the batches of articles from the volume value produced by said volume detecting means and the weight value produced by said weighing section; and
   target weight adjusting means, operatively connected to the weighing section, for adjusting the target weight value within the preset allowable limits on the basis of the detected density, in such a manner that the volume of the batches of articles discharged into the packaging vessel becomes substantially constant.

3. A combinatorial weighing apparatus having a weighing section for weighing out batches of articles, which exhibit a variable apparent specific gravity, to a weight value equal to a target weight value or closest to the target weight value within preset allowable limits, and for discharging the weighed out batches of articles in order that the batches of articles may be packaged in a packaging vessel, said apparatus comprising:

volume detecting means, operatively connected to the weighing section, for detecting the volume of the batches of articles supplied to the weighing section and outputting a volume value;

density detecting means, operatively connected to said volume detecting means, for detecting the density of the batches of articles from the volume value produced by said volume detecting means and the weight value produced by said weighing section; and adjusting means, operatively connected to said density detecting means, for adjusting the size of individual articles on the basis of the detected density in such a manner that the density of the batches of articles becomes substantially constant.

4. A combinatorial weighing apparatus according to claim 3, further comprising target weight adjusting means, operatively connected to said density detecting means, for adjusting the target weight value within the preset allowable limits on the basis of the detected density in such a manner that the volume of the batches of articles discharged into the packaging vessel becomes substantially constant.

5. A combinatorial weighting method for weighing out batches of articles in a weighing section, the batches of articles having a variable apparent specific gravity, to a weight value equal to or closest to a target weight value, and for discharging the weighed out batches of articles in order that the batches of articles may be packaged in a packaging vessel, said method comprising the steps of:

(a) weighing out the batches of articles, to a weight value equal to the target weight value or closest to the target weight value within preset allowable limits, to the weighing section;

(b) detecting the volume of the batches of articles supplied to the weighing section;

(c) detecting the density of the batches of articles in accordance with the weight value and the detected volume; and (d) adjusting the target weight value to be within the preset allowable limits, in accordance with the detected density, in such a manner that the volume of the batches of articles discharged into the packaging vessel becomes substantially constant.

6. A combinatorial weighing method for weighing out batches of articles in a weighing section to a weight value equal to or closest to a target weight value, the batches of articles having a variable apparent specific gravity, and for discharging the weighed out batches of articles in order that the batches of articles may be packaged in a packaging vessel, said method comprising the steps of:

(a) weighing out the batches of articles, to a weight value equal to the target weight value or closest to the target weight value within preset allowable limits, to the weighing section;

(b) shaping the batches of articles in the weighing section, weighed out in said step (a), into a prescribed, constant volume;

(c) detecting the volume of the batches of articles supplied to the weighing section;

(d) detecting the density of the batches of articles in accordance with the weight value and the volume of the batches of articles; and (e) adjusting the target weight value to be within the preset allowable limits in accordance with the detected density in such a manner that the volume of the batches of articles discharged into the packaging vessel becomes substantially constant.

7. A combinatorial weighing method for weighing out batches of articles in a weighing section, to a weight value equal to or closest to a target weight value, the batches of articles having a variable apparent specific gravity, and for discharging the weighed out batches of articles in order that the batches of articles may be packaged in a packaging vessel, said method comprising the steps of:

(a) weighing out the batches of articles, to a weight value equal to the target weight value or closest to the target weight value within preset allowable limits, to the weighing section;

(b) detecting the volume of the batches of articles supplied to the weighing section;

(c) detecting the density of the batches of articles in the weighing section in accordance with the weight value and the detected volume; and (d) adjusting the size of individual batches of articles in accordance with the detected density in such a manner that the density of the individual batches of articles becomes substantially constant.

8. A combinatorial weighing method according to claim 7, further comprising a step of adjusting the target weight value within the preset allowable limits in accordance with the detected density in such a manner that the volume of the individual batches of articles discharged into the packaging vessel becomes substantially constant.

9. An appartus for packaging batches of articles having variable specific gravity, comprising:

means for sensing the volume of the batches of articles;

means, operatively connected to said means for sensing, for detecting the density of the batches of articles in accordance with the volume sensed by said sensing means;

means, operatively connected to said detecting means, for shaping the batches of articles into a fixed volume in accordance with the density of the batches of articles; and means, operatively connected to said shaping means, for packaging the shaped batches of articles.

10. A method for packaging batches of articles having variable specific gravity, comprising the steps of:

weighing out the batches of articles to a weight value equal or closest to a predetermined target weight value;

sensing the volume and determining the density of the batches of articles in accordance with the sensed volume and the weight value;

adjusting the size of the batches of articles based on the value of the density sensed by said sensing means; and packaging the batches of articles which have been adjusted in size.

* * * * *

UNITED STATES PATENT AND TRADEMARK OFFICE
CERTIFICATE OF CORRECTION

PATENT NO. : 4,548,286
DATED : OCTOBER 22, 1985
INVENTOR(S) : TAKASHI SASHIKI ET AL.

It is certified that error appears in the above-identified patent and that said Letters Patent is hereby corrected as shown below:

FRONT PAGE [56] References Cited, "3,703,795" should be --3,703,796--.

Col. 2, line 57, "persng" should be --persing--.

Col. 6, line 14, delete "b".

Col. 7, line 46, "articles" should be --article--.

Col. 10, line 43, "articles" should be --article--.

Col. 11, line 50, "WM1" should be --VM1--;
       line 54, "VM1, VM2" should be --WM1, WM2--;
       line 61, "VMm" should be --WMm--.

Col. 12, line 65, delete "the" (fourth occurrence).

Col. 13, line 41, "charged" should be --discharged--;
       line 46, "an" should be --a--.

Signed and Sealed this

Eighteenth Day of March 1986

[SEAL]

Attest:

DONALD J. QUIGG

Attesting Officer

Commissioner of Patents and Trademarks